(12) United States Patent
Kim et al.

(10) Patent No.: US 11,693,276 B2
(45) Date of Patent: Jul. 4, 2023

(54) DISPLAY DEVICE

(71) Applicant: LG ELECTRONICS INC., Seoul (KR)

(72) Inventors: Geunhwan Kim, Seoul (KR); Wondo Kee, Seoul (KR); Sangsoo Hwang, Seoul (KR); Seongjun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/444,466

(22) Filed: Aug. 4, 2021

(65) Prior Publication Data
US 2022/0252932 A1 Aug. 11, 2022

(30) Foreign Application Priority Data

Feb. 8, 2021 (KR) .................... 10-2021-0017761

(51) Int. Cl.
*G02F 1/1335* (2006.01)
(52) U.S. Cl.
CPC .. *G02F 1/133614* (2021.01); *G02F 1/133512* (2013.01)
(58) Field of Classification Search
None
See application file for complete search history.

(56) References Cited

U.S. PATENT DOCUMENTS

| 10,290,776 B1* | 5/2019 | Fan | H01L 33/504 |
| 2010/0296024 A1* | 11/2010 | Ishimaru | G02B 5/20 |
| | | | 349/61 |
| 2012/0267999 A1* | 10/2012 | Sakuta | C09K 11/7739 |
| | | | 313/503 |
| 2013/0193837 A1* | 8/2013 | Ohno | B32B 15/00 |
| | | | 428/690 |
| 2017/0145309 A1* | 5/2017 | Zhu | C09K 11/025 |
| 2018/0252963 A1* | 9/2018 | Kim | G02F 1/133602 |

(Continued)

FOREIGN PATENT DOCUMENTS

| CN | 107656330 A | * | 2/2018 | ........... G02F 1/1336 |
| CN | 108549175 A | * | 9/2018 | |
| JP | 2007157798 A | * | 6/2007 | |

(Continued)

OTHER PUBLICATIONS

PCT International Application No. PCT/KR2021/005240, International Search Report dated Nov. 1, 2021, 3 pages.

*Primary Examiner* — Shan Liu
(74) *Attorney, Agent, or Firm* — Lee Hong Degerman Kang & Waimey

(57) ABSTRACT

Disclosed is a display device. The display device includes a display panel, an optical assembly configured to provide blue-based light to the display panel, and a light-absorbing layer located in the path of light provided from the optical assembly to the display panel, the light-absorbing layer being configured to absorb light in a predetermined wavelength range. The light provided to the display panel through the light-absorbing layer has optical characteristics such that the intensity of green-based light is 20 to 70% of the intensity (100%) of the blue-based light and the intensity of red-based light is 20 to 70% of the intensity of the blue-based light.

7 Claims, 15 Drawing Sheets

(56) References Cited

U.S. PATENT DOCUMENTS

2021/0033926 A1    2/2021  Lim

FOREIGN PATENT DOCUMENTS

| KR | 1020170027248 | 3/2017 |
| KR | 101790511 | 10/2017 |
| KR | 101802052 | 11/2017 |
| KR | 1020180101111 | 9/2018 |
| WO | WO-2018192228 A1 * | 10/2018 |

* cited by examiner

DISPLAY DEVICE

CROSS-REFERENCE TO RELATED APPLICATIONS

Pursuant to 35 U.S.C. § 119 (a), this application claims the benefit of an earlier filing date and right of priority to Korean Patent Application No. 10-2021-0017761 filed on Feb. 8, 2021, the contents of which is hereby incorporated by reference herein in its entirety.

BACKGROUND OF THE INVENTION

1. Field of the Invention

The present disclosure relates to a control box and a display device including the same.

2. Description of the Related Art

With the advent of the information society, various demands for display devices are increasing. Various display devices, such as liquid crystal display (LCD) devices, organic light-emitting diode (OLED) devices, and micro LED devices, have recently been studied and used in response to various demands for display devices.

Thereamong, a liquid crystal panel of an LCD includes a liquid crystal layer, and further includes a thin-film transistor (TFT) substrate and a color filter substrate, which are disposed opposite each other, with the liquid crystal layer interposed therebetween. The liquid crystal panel displays an image using light provided from a backlight unit.

In recent years, interest in the image quality of display devices has increased, and thus representation or reproduction of color close to true color has attracted significant attention, and various studies have been conducted on improvement in image quality for implementing the true color.

SUMMARY OF THE INVENTION

It is an object of the present disclosure to solve the above and other problems. It is another object of the present disclosure to provide a display device capable of improving image quality.

It is still another object of the present disclosure to provide a display device capable of exhibiting improved color reproduction.

It is still another object of the present disclosure to provide a display device capable of effectively controlling the wavelength of light provided from a backlight unit.

In order to accomplish the above and other objects, a display device according to one aspect of the present disclosure may include a display panel, an optical assembly configured to provide blue-based light to the display panel, and a light-absorbing layer located in the path of light provided from the optical assembly to the display panel, the light-absorbing layer being configured to absorb light in a predetermined wavelength range. The light provided to the display panel through the light-absorbing layer may have optical characteristics such that the intensity of green-based light is 20 to 70% of the intensity (100%) of the blue-based light and the intensity of red-based light is 20 to 70% of the intensity of the blue-based light.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function.

In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being "connected with" another element, there may be intervening elements present. In contrast, it will be understood that when an element is referred to as being "directly connected with" another element, there are no intervening elements present.

A singular representation may include a plural representation unless context clearly indicates otherwise.

In the present application, it should be understood that the terms "comprises," "includes," "has," etc. specify the presence of features, numbers, steps, operations, elements, components, or combinations thereof described in the specification, but do not preclude the presence or addition of one or more other features, numbers, steps, operations, elements, components, or combinations thereof.

Hereinafter, a liquid crystal display (LCD) will be described as an example of a display panel. However, the display panel that is applicable to the present disclosure is not limited to a liquid crystal display.

Figure 1:
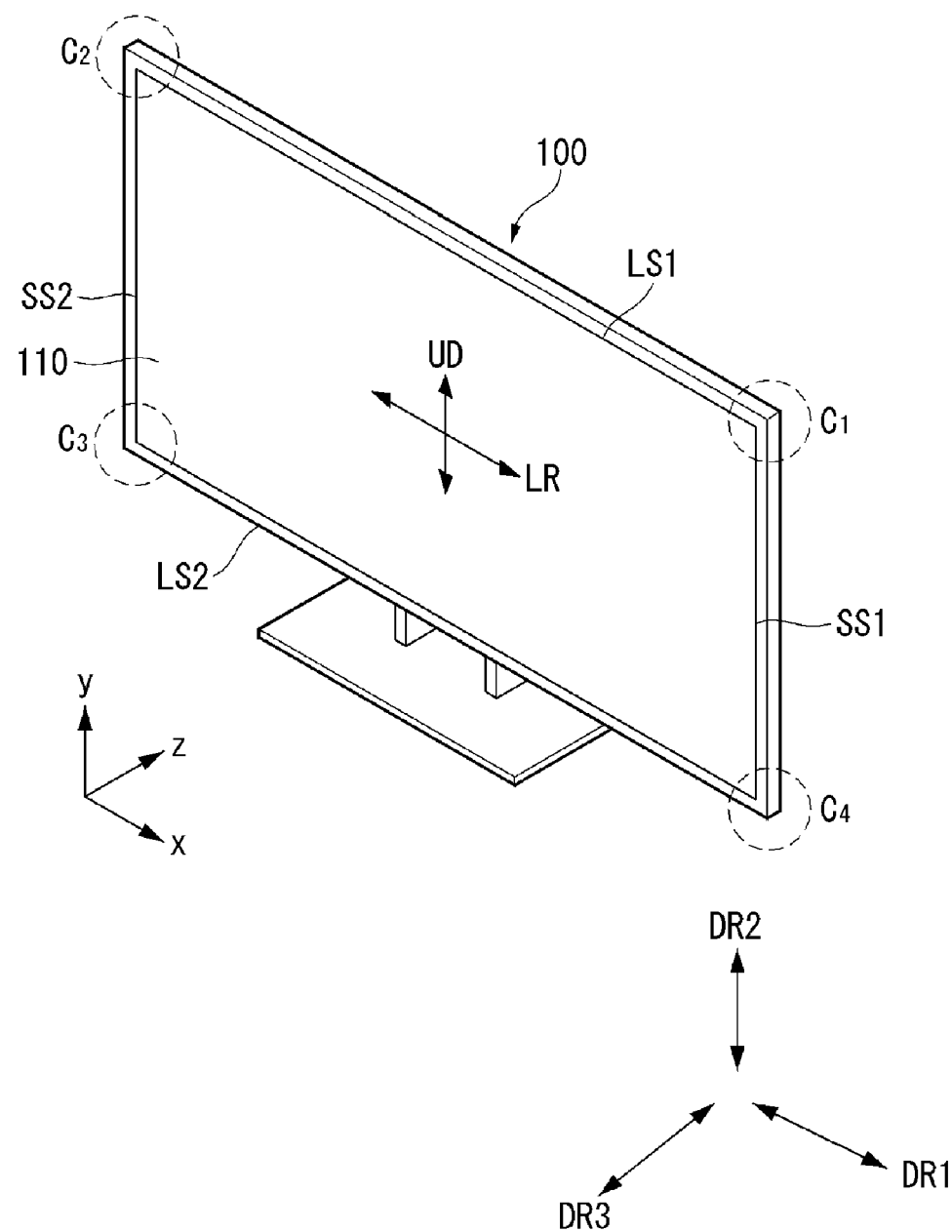
FIGS. 1 to 5 are views showing examples of a display device according to embodiments of the present disclosure.

Referring to FIG. 1, a display device may include a first long side LS1, a second long side LS2 opposite the first long side LS1, a first short side SS1 adjacent to the first long side LS1 and the second long side LS2, and a second short side SS2 opposite the first short side SS1.

The first short side area SS1 may be referred to as a first side area, the second short side area SS2 may be referred to as a second side area opposite the first side area, the first long side area LS1 may be referred to as a third side area adjacent to the first side area and the second side area and located between the first side area and the second side area, and the second long side area LS2 may be referred to as a fourth side area adjacent to the first side area and the second side area, located between the first side area and the second side area, and opposite the third side area.

Although the length of each of the first and second long sides LS1 and LS2 is shown and described as being greater than the length of each of the first and second short sides SS1 and SS2, the length of each of the first and second long sides LS1 and LS2 may be approximately equal to the length of each of the first and second short sides SS1 and SS2.

A first direction DR1 may be a direction parallel to the long sides LS1 and LS2 of a display panel 100, and a second direction DR2 may be a direction parallel to the short sides SS1 and SS2 of the display panel 100. A third direction DR3 may be a direction perpendicular to the first direction DR1 and/or the second direction DR2.

The first direction DR1 and the second direction DR2 may be collectively referred to as a horizontal direction. The third direction DR3 may be referred to as a vertical direction.

The side of the display device at which an image is displayed may be referred to as a forward direction, a front side, or a front surface. The side of the display device at which an image is not observed when the display device displays the image may be referred to as a rearward direction, a rear side, or a rear surface.

When the display is seen from the front side or the front surface, the first long side portion LS1 may be referred to as an upper side or an upper surface. Similarly, the second long side portion LS2 may be referred to as a lower side or a lower surface. Similarly, the first short side portion SS1 may be referred to as a right side or a right surface, and the second short side portion SS2 may be referred to as a left side or a left surface.

The first long side LS1, the second long side LS2, the first short side SS1, and the second short side SS2 may be referred to as edges of the display device. In addition, the points at which the first long side LS1, the second long side LS2, the first short side SS1, and the second short side SS2 join may be referred to as corners. For example, the point at which the first long side LS1 and the first short side SS1 join may be referred to as a first corner C1, the point at which the first long side LS1 and the second short side SS2 join may be referred to as a second corner C2, the point at which the second short side SS2 and the second long side LS2 join may be referred to as a third corner C3, and the point at which the second long side LS2 and the first short side SS1 join may be referred to as a fourth corner C4.

The direction from the first short side SS1 to the second short side SS2 or the direction from the second short side SS2 to the first short side SS1 may be referred to as a leftward-rightward direction LR. The direction from the first long side LS1 to the second long side LS2 or the direction from the second long side LS2 to the first long side LS1 may be referred to as an upward-downward direction UD.

Figure 2:
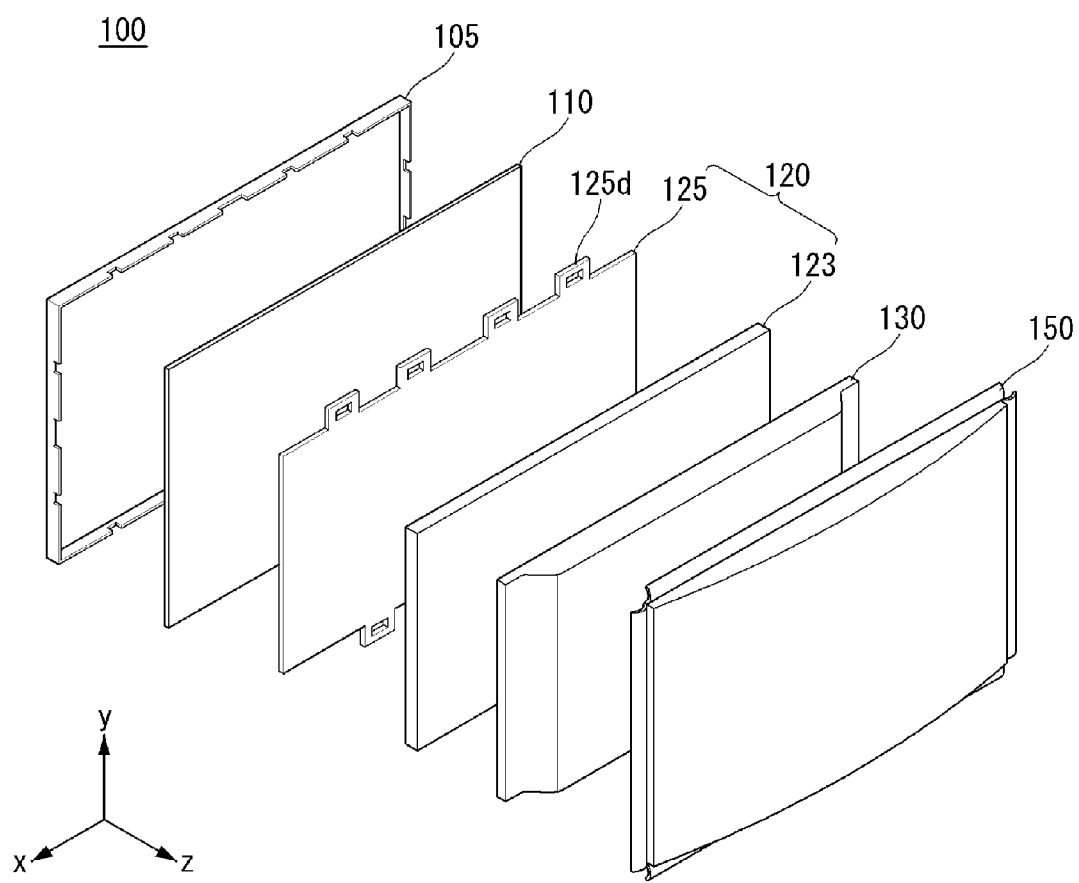

Referring to FIG. 2, a front cover 105 may cover at least a part of the front surface and the lateral surface of a display panel 110. The front cover 105 may be divided into a front cover, which is located on the front side of the display panel 110, and a lateral cover, which is located on the lateral side of the display panel 110. One of the front cover and the lateral cover may be omitted.

The display panel 110 may be located at the front side of the display device 100, and may display an image. The display panel 110 may display an image in a manner such that each of a plurality of pixels outputs red, green or blue (RGB) light according to a predetermined timing. The display panel 110 may be divided into an active area, in which an image is displayed, and a de-active area, in which an image is not displayed. The display panel 110 may include a front substrate and a rear substrate, which are disposed opposite each other, with a liquid crystal layer interposed therebetween.

The front substrate may include a plurality of pixels composed of red (R), green (G), and blue (B) subpixels. The front substrate may emit red light, green light, or blue light in response to a control signal.

The rear substrate may include switching elements. The rear substrate may switch a pixel electrode. For example, the pixel electrode may change the molecular arrangement of the liquid crystal layer in response to a control signal applied thereto from the outside. The liquid crystal layer may include liquid crystal molecules. The arrangement of the liquid crystal molecules may change according to a voltage difference generated between the pixel electrode and a common electrode. The liquid crystal layer may allow or interrupt the transmission of the light from a backlight unit 120 to the front substrate.

The backlight unit 120 may be located behind the display panel 110. The backlight unit 120 may include light sources. The backlight unit 120 may be coupled to a frame 130 at the front side of the frame 130.

The backlight unit 120 may be driven in a fully driven manner or a partially driven manner, such as local dimming or impulsive driving. The backlight unit 120 may include an optical sheet 125 and an optical layer 123. The optical layer 123 may be termed an optical module 123 or an optical unit 123.

The optical sheet 125 may enable the light from the light source to be uniformly transmitted to the display panel 110. The optical sheet 125 may be composed of a plurality of layers. For example, the optical sheet 125 may include a prism sheet, a diffusion sheet, and the like. The optical sheet 125 may have a coupling portion 125$d$. The coupling portion 125$d$ may be coupled to the front cover 105, the frame 130, and/or the back cover 150. Alternatively, the coupling portion 125$d$ may be fastened to a structure formed at or coupled to the front cover 105, the frame 130, and/or the back cover 150.

The frame 130 may serve to support components of the display device 100. For example, the backlight unit 120 may be coupled to the frame 130. The frame 130 may be made of a metal material such as an aluminum alloy.

The back cover 150 may be located at the rear surface or the rear side of the display device 100. The back cover 150 may be coupled to the frame 130 and/or the front cover 105. For example, the back cover 150 may be an injection-molded product made of a resin material.

Figure 3:
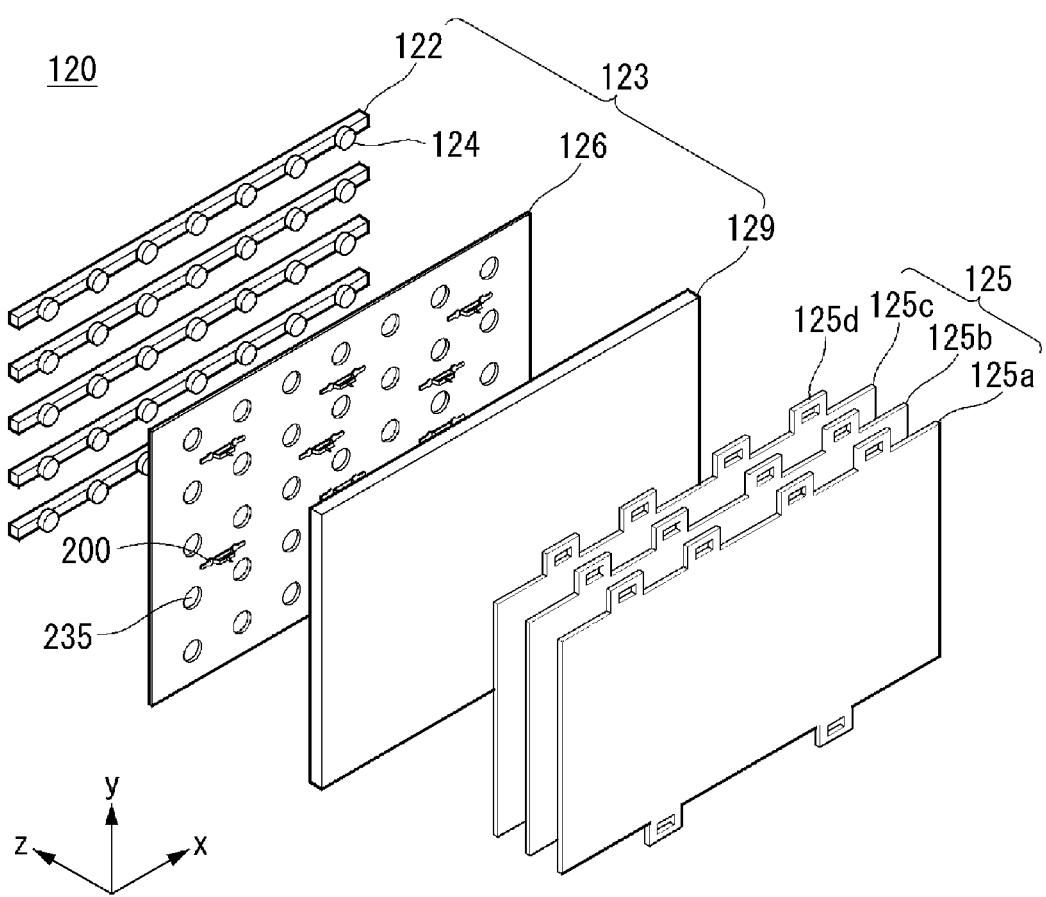

Referring to FIG. 3, the backlight unit 120 may include: an optical layer 123, which includes a substrate 122, at least one optical assembly 124, a reflective sheet 126, and a diffusion plate 129; and an optical sheet 125, which is located on the front surface of the optical layer 123. However, the configuration of the backlight unit 120 is not limited thereto.

The substrate 122 may include a plurality of straps, which extend in a first direction and are spaced apart from each other by a predetermined distance in a second direction, perpendicular to the first direction.

At least one optical assembly 124 may be mounted on the substrate 122. An electrode pattern for connecting an adapter to the optical assembly 124 may be formed on the substrate 122. For example, a carbon nanotube electrode pattern for connecting the adapter to the optical assembly 124 may be formed on the substrate 122.

The substrate 122 may be formed of at least one of polyethylene terephthalate (PET), glass, polycarbonate (PC), or silicon. The substrate 122 may be a printed circuit board (PCB) on which at least one optical assembly 124 is mounted.

A plurality of optical assemblies 124 may be disposed on the substrate 122 in the state of being spaced apart from each other by a predetermined distance in the first direction. The diameter of each optical assembly 124 may be greater than the width of the substrate 122. In other words, the diameter of each optical assembly 124 may be greater than the length of the substrate 122 in the second direction.

The optical assembly 124 may be a light-emitting diode (LED) chip or an LED package including at least one LED chip.

The optical assembly 124 may be composed of a white LED or a colored LED, which emits at least one of a red color, a blue color, or a green color. The colored LED may include at least one of a red LED, a blue LED, or a green LED.

The reflective sheet 126 may be located on the front surface of the substrate 122. The reflective sheet 126 may be located in a region other than the region of the substrate 122 in which the optical assembly 124 is formed. The reflective sheet 126 may have therein a plurality of through-holes 235.

The reflective sheet 126 may reflect the light emitted from the optical assembly 124 to the front side. Further, the reflective sheet 126 may again reflect the light reflected from the diffusion plate 129.

The reflective sheet 126 may include a reflective material, for example, at least one of a metal or a metal oxide. For example, the reflective sheet 126 may include a highly reflective metal, for example, at least one of aluminum (Al), silver (Ag), gold (Au), or titanium dioxide (TiO2), and/or a metal oxide.

A resin may be deposited on or applied to the optical assembly 124 and/or the reflective sheet 126. The resin may serve to diffuse the light emitted from the optical assembly 124. The diffusion plate 129 may diffuse the light emitted from the optical assembly 124 upwards.

The optical sheet 125 may be located in front of the diffusion plate 129. The rear surface of the optical sheet 125 may be in close contact with the diffusion plate 129, and the front surface of the optical sheet 125 may be in close contact with or adjacent to the rear surface of the display panel 110.

The optical sheet 125 may include at least one sheet. In detail, the optical sheet 125 may include one or more prism sheets and/or one or more diffusion sheets. The plurality of sheets included in the optical sheet 125 may be in an adhered state and/or a close-contact state.

The optical sheet 125 may be composed of a plurality of sheets having different functions from each other. For example, the optical sheet 125 may include first to third optical sheets 125a to 125c. For example, the first optical sheet 125a may be a diffusion sheet, and the second and third optical sheets 125b and 125c may be prism sheets. The number and/or position of diffusion sheets and the number and/or position of prism sheets may be changed.

The diffusion sheet may prevent the light from the diffusion plate from being nonuniformly concentrated, thereby achieving more uniform distribution of light. The prism sheet may collect the light from the diffusion sheet and may provide the light to the display panel 110.

The coupling portion 125d may be formed on at least one of the sides or the edges of the optical sheet 125. The coupling portion 125d may be formed on at least one of the first to third optical sheets 125a to 125c.

The coupling portion 125d may be formed on the long side of the optical sheet 125. The coupling portion 125d formed on the first long side of the optical sheet 125 and the coupling portion 125d formed on the second long side of the optical sheet 125 may be asymmetric. For example, the position and/or number of coupling portions 125d formed on the first long side and the position and/or number of coupling portions 125d formed on the second long side may be different from each other.

Figure 4:
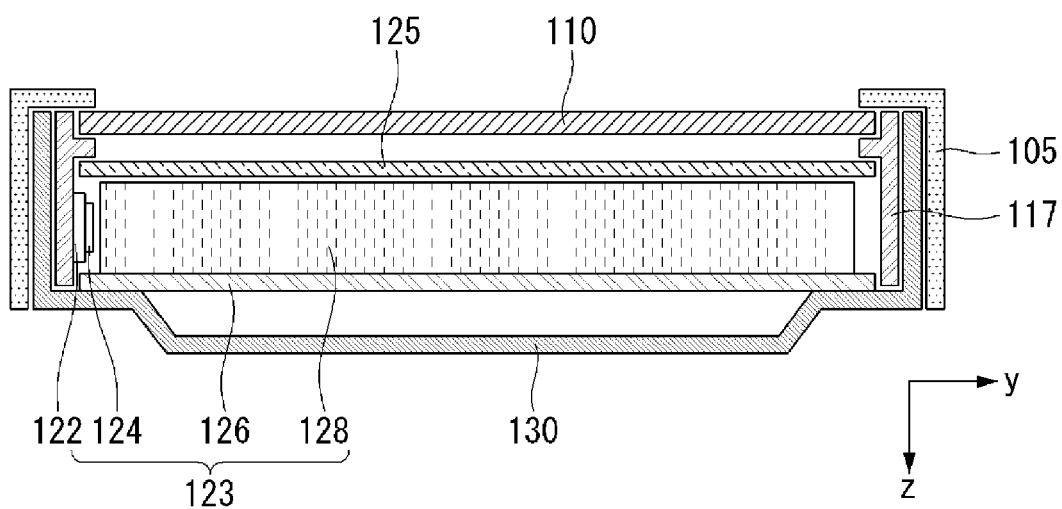

Referring to FIG. 4, the optical layer 123 may include a substrate 122, a reflective sheet 126, an optical assembly 124, and a light guide plate 128. The optical layer 123 may not include some of these components.

The optical layer 123 may be located in front of the frame 130. The optical layer 123 may be located between the frame 130 and the display panel 110. The optical layer 123 may be supported by the frame 130.

The substrate 122 may be located on one side of the frame 130. The substrate 122 may be located adjacent to the lateral surface of the reflective sheet 126 and/or the light guide plate 128. The optical assembly 124 mounted on the substrate 122 may provide light to the light guide plate 128. The light incident on the light guide plate 128 may be directed to the display panel 110 by the light guide plate 128 and the reflective sheet 126.

Figure 5:
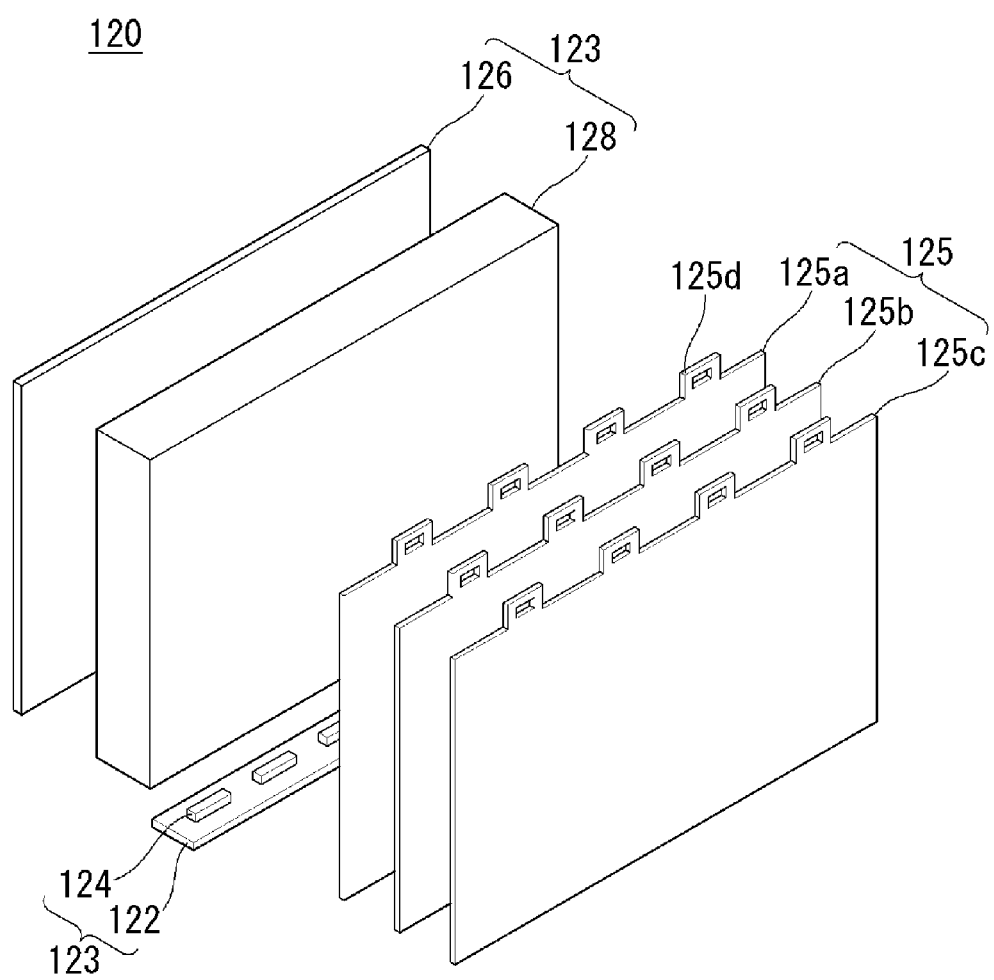

Referring to FIG. 5, the substrate 122 may be located on one side of another component of the optical layer 123. The optical assembly 124 or the optical assemblies 124 may be mounted on the substrate 122. An electrode pattern for connecting the adapter to the optical assembly 124 may be formed on the substrate 122. For example, a carbon nanotube electrode pattern for connecting the adapter to the optical assembly 124 may be formed on the substrate 122. For example, the substrate 122 may be a printed circuit board (PCB).

The optical assemblies 124 may be disposed on the substrate 122 in the state of being spaced apart from each other by a predetermined distance. The optical assembly 124 may be a light-emitting diode (LED) chip or an LED package including at least one LED chip. The optical assembly 124 may be composed of a white LED or a colored LED, which emits at least one of a red color, a blue color, or a green color.

The light source included in the optical assembly 124 may be of a chip-on-board (COB) type. The COB-type optical assembly may be formed such that an LED chip, which is a light source, is directly coupled to the substrate 122. Therefore, processing may be simplified, and electrical resistance may be lowered, whereby loss of energy due to heat may be reduced. The COB-type optical assembly may provide brighter light. The COB-type optical assembly may be made thinner and more lightweight than the conventional art.

The light guide plate 128 may enable the light incident thereon from the optical assembly 124 to spread widely. The reflective sheet 126 may be located between the light guide plate 128 and the frame 130. The reflective sheet 126 may reflect the light provided from the optical assembly 124. The reflective sheet 126 may again reflect the light from the light guide plate 128 to the light guide plate 128.

The reflective sheet 126 may include a reflective material, for example, at least one of a metal or a metal oxide. For example, the reflective sheet 126 may include a highly reflective metal, for example, at least one of aluminum (Al), silver (Ag), gold (Au), or titanium dioxide (TiO2), and/or a metal oxide.

The reflective sheet 126 may be formed by depositing and/or coating a metal or a metal oxide. The reflective sheet 126 may be printed with an ink containing a metal material to form a reflective layer. The reflective sheet 126 may have a deposition layer formed using a vacuum deposition method such as a thermal deposition method, an evaporation method, or a sputtering method. The reflective sheet 126 may be provided with a coating layer and/or a printing layer formed using a printing method, a gravure coating method, or a silkscreen method.

A diffusion part (not shown) may be formed on the front surface of the light guide plate. The diffusion part may diffuse the light emitted from the light guide plate 128 forwards.

The optical sheet 125 may be located in front of the light guide plate 128. The rear surface of the optical sheet 125 may face the light guide plate 128, and the front surface of the optical sheet 125 may face the display panel 110.

The optical sheet 125 may include at least one sheet. The optical sheet 125 may include one or more prism sheets and/or one or more diffusion sheets. The plurality of sheets included in the optical sheet 125 may be in an adhered state and/or a close-contact state.

For example, the optical sheet 125 may include first to third optical sheets 125a to 125c. The first optical sheet 125a may be a diffusion sheet, and the second and third optical sheets 125b and 125c may be prism sheets. The number and/or position of diffusion sheets and the number and/or position of prism sheets may be changed.

The diffusion sheet may prevent the light from the light guide plate 128 from being nonuniformly concentrated, thereby achieving uniform distribution of light. The prism sheet may collect the light from the diffusion sheet and may provide the light to the display panel 110.

Figure 6:
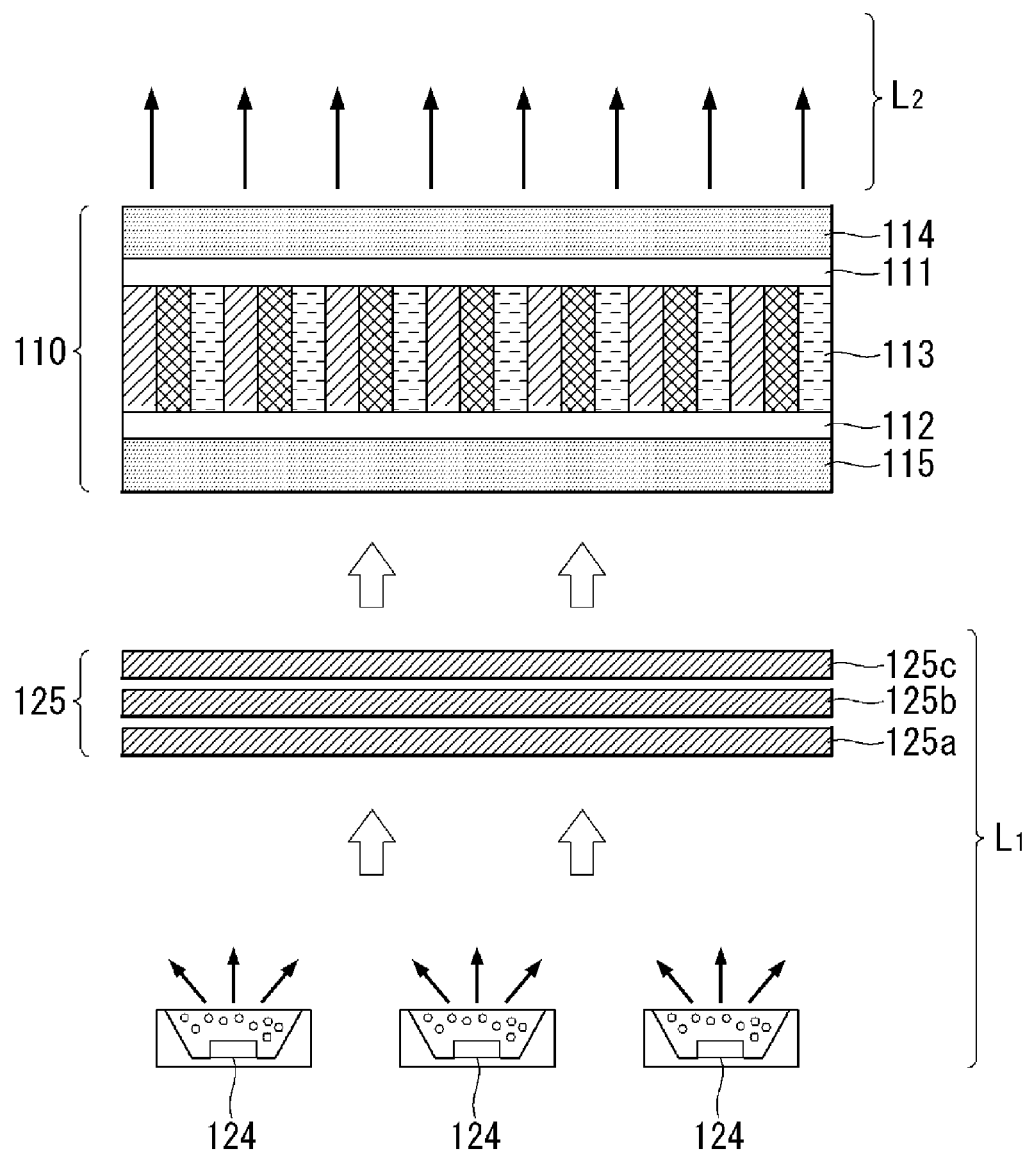
FIGS. 6 and 7 are views showing examples of a spectrum of light from a light source for providing light to a display panel according to embodiments of the present disclosure.

Referring to FIG. 6, the optical assembly 124 may provide light to the optical sheet 125. The light scattered to and/or concentrated onto the optical sheet 125 may be provided to the display panel 110. The display panel 110 may display an image using this light.

When the light incident on the display panel 110 from the optical assembly 124 is denoted by L1 and the light that has passed through the display panel 110 is denoted by L2, the light L1 and the light L2 may have different spectra from each other.

Figure 7:
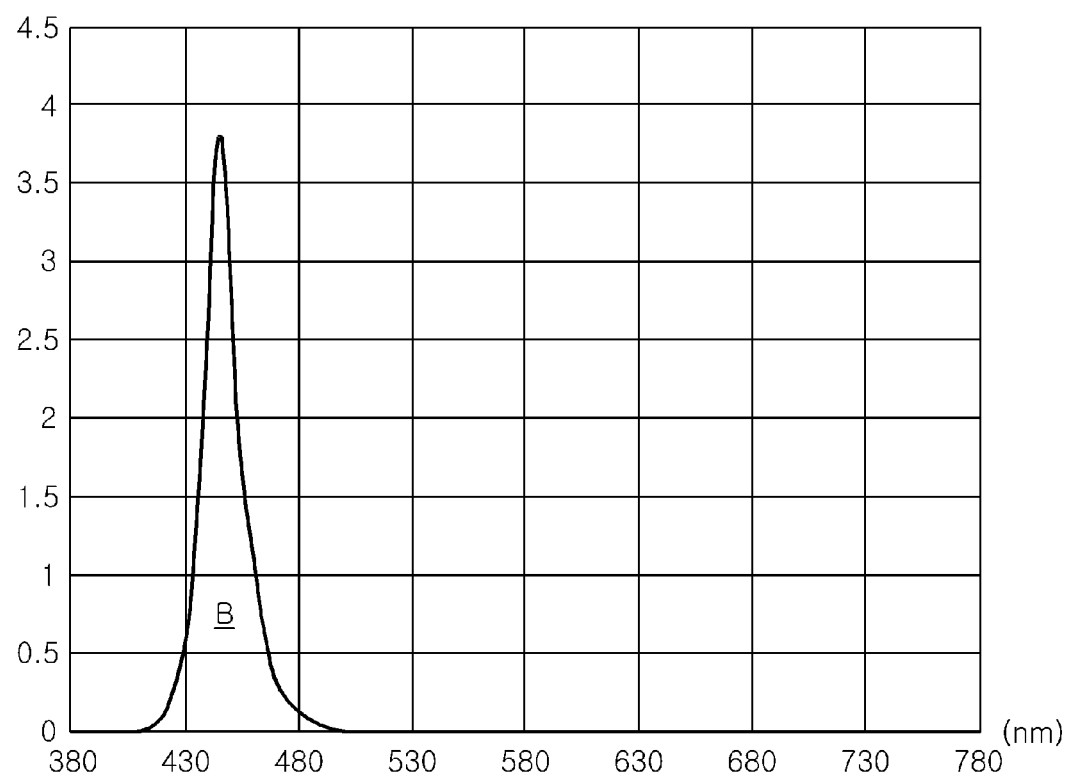

The graph shown in FIG. 7 may be an example of the spectrum of L1. Here, the x-axis represents the wavelength (nm) of light, and the y-axis represents the intensity (or radiant flux (W)) of light. "B" represents the intensity or distribution of blue-based light.

The optical assembly 124 (refer to FIG. 6) may include an LED as a light source. The LED may emit blue light. The light source 124, that is, the LED, may provide light L1 of the wavelength and/or intensity shown in FIG. 7.

For example, the optical assembly 124 may provide blue-based light within a wavelength range of 430 to 465 nm.

In order to use the light emitted from the light source 124 to realize high-purity color (excellent color representation) through the display panel 110 and thus to realize high image quality, it is required to provide high-purity white light to the display panel 110.

Figure 8:
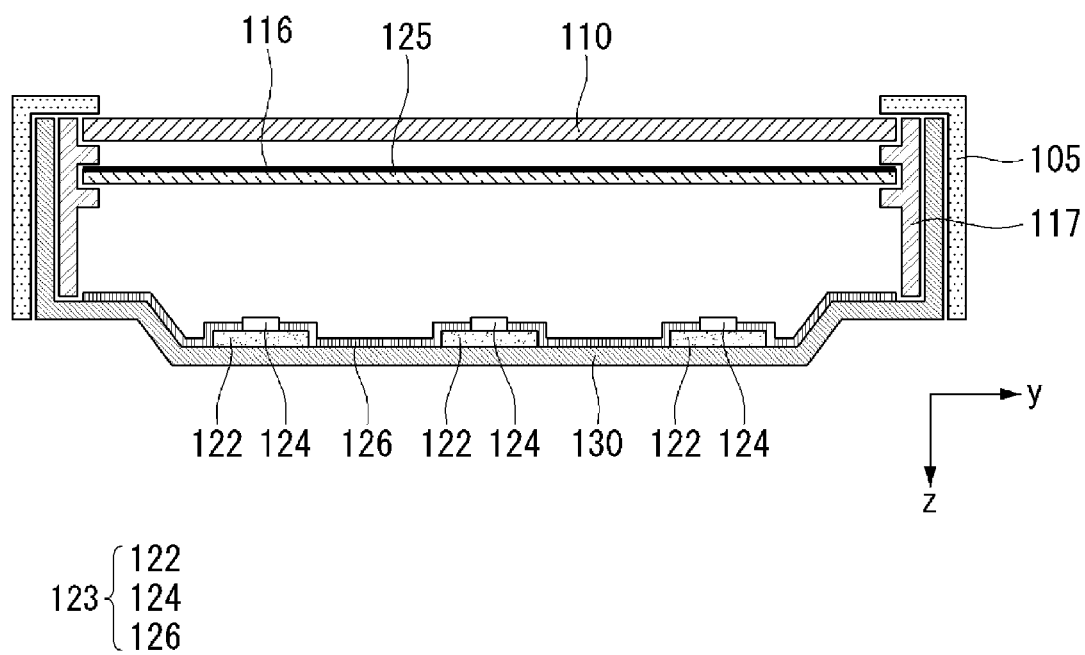
FIGS. 8 to 11 are views showing examples of a display device including a light-absorbing layer according to embodiments of the present disclosure.

Referring to FIG. 8, a light-absorbing layer 116 may be located in front of the optical sheet 125, may be formed on the front surface of the optical sheet 125, or may be adhered to or deposited on the front surface of the optical sheet 125. The light-absorbing layer 116 may be located in the path of the light that is emitted from the optical assembly 124 and travels toward the display panel 110.

For example, the light-absorbing layer 116 may include a plurality of layers. The plurality of layers may be configured as quantum dot (QD) enhancement films and/or nano organic films (NOFs).

Figure 9:
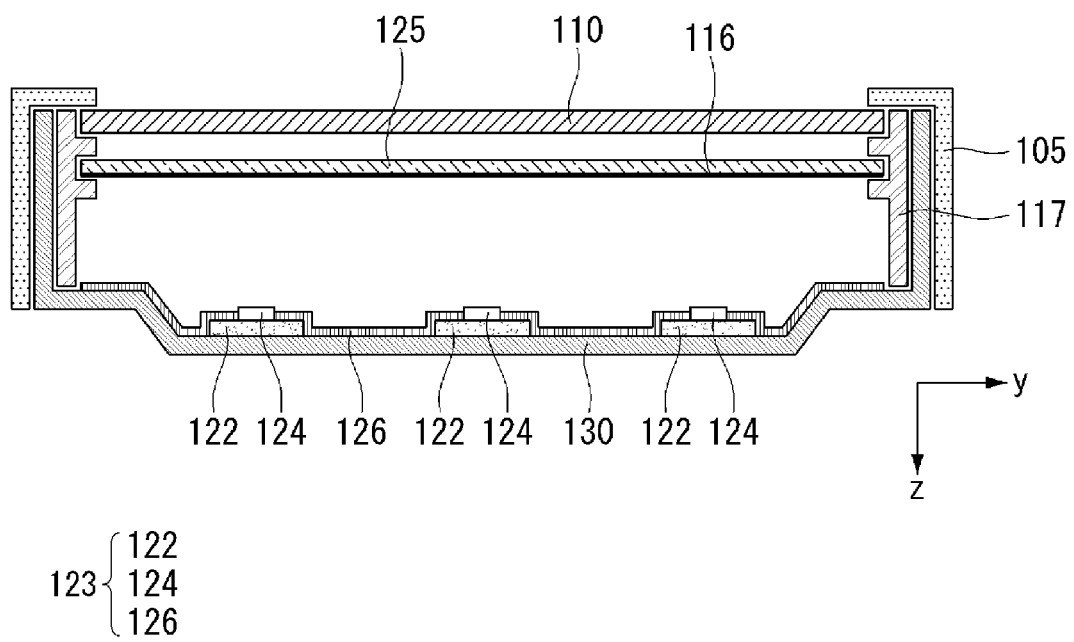

Referring to FIG. 9, the light-absorbing layer 116 may be located behind the optical sheet 125, may be formed on the rear surface of the optical sheet 125, or may be adhered to or deposited on the rear surface of the optical sheet 125. The light-absorbing layer 116 may be located in the path of the light that is emitted from the optical assembly 124 and travels to the display panel 110.

For example, the light-absorbing layer 116 may include a quantum dot (QD) enhancement film and/or a nano organic film (NOF).

Figure 10:
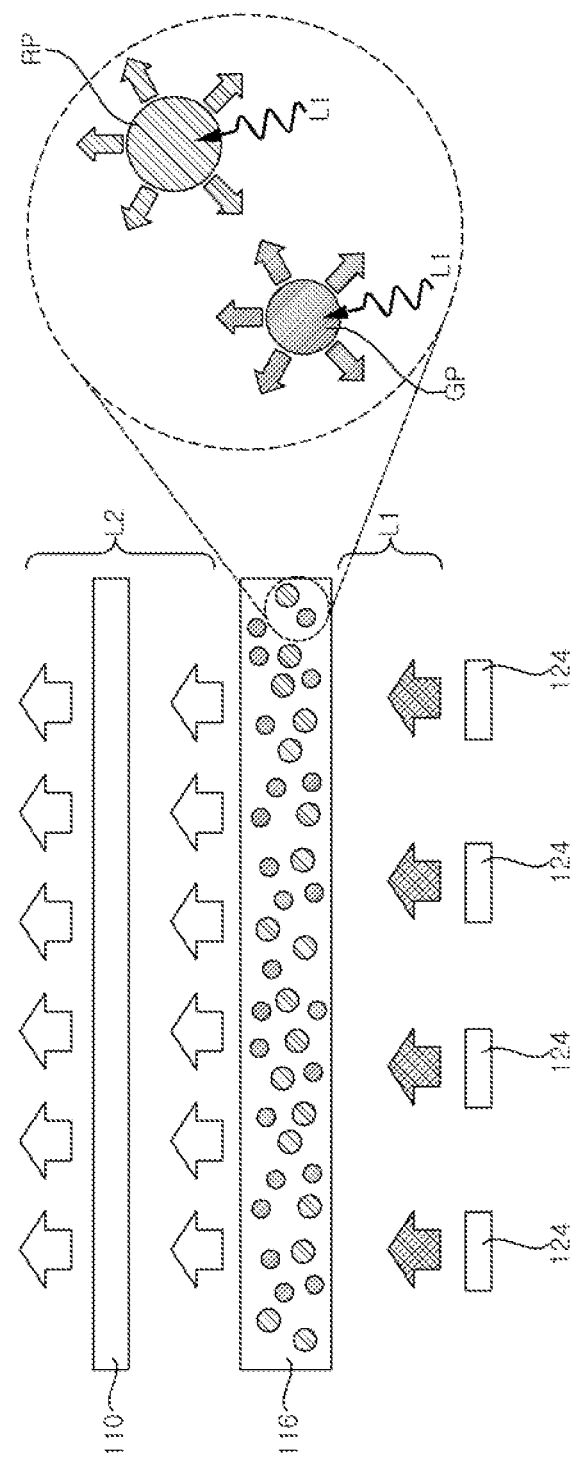

Referring to FIG. 10, the light-absorbing layer 116 may be located between the display panel 110 and the optical assembly 124. The light-absorbing layer 116 may include a green phosphor GP and a red phosphor RP. For example, the green phosphor GP may be a particle (SrGa2S4:Eu) having a size of 3 to 7 micrometers, and the red phosphor RP may be a particle ((Sr,Ca)AlSiN3:Eu) having a size of 1 micrometer or less.

The light L1 provided from the optical assembly 124, for example, blue-based light (refer to FIG. 7), may excite the green phosphor GP. The light L1 provided from the optical assembly 124, for example, blue-based light (refer to FIG. 7), may excite the red phosphor RP. At this time, the light L1 (refer to FIG. 7) provided from the optical assembly 124 may have optical characteristics L1 such that blue-based light has high intensity. However, while passing through the light-absorbing layer 116, the light L1 may be converted into light L2 in which green (G)-based light and red (R)-based light have increased or enhanced intensity.

Figure 11:
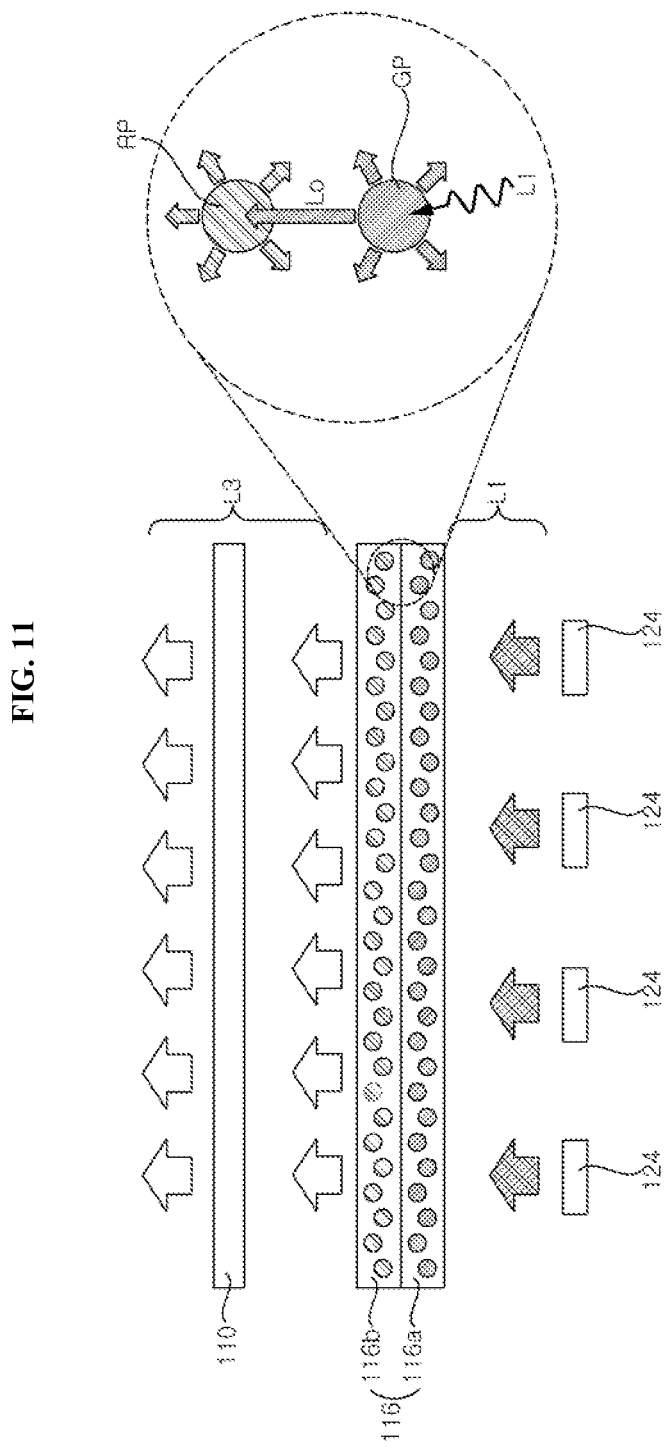

Referring to FIG. 11, the light-absorbing layer 116 may be located between the display panel 110 and the optical assembly 124, and may include a first light-absorbing layer 116a and a second light-absorbing layer 116b. The first light-absorbing layer 116a may include a green phosphor GP, and the second light-absorbing layer 116b may include a red phosphor RP.

The first light-absorbing layer 116a may be a quantum dot (QD) enhancement film including a green phosphor GP, and the second light-absorbing layer 116b may be a nano organic film (NOF) including a red phosphor RP. For example, the first light-absorbing layer 116a may be a film having a thickness of approximately 90 micrometers, and the second light-absorbing layer 116b may be a film having a thickness of approximately 3 micrometers.

The first light-absorbing layer 116a may absorb blue-based light and emit green-based light, and the second light-absorbing layer 116b may absorb green-based light and emit red-based light. For example, the first light-absorbing layer 116a may absorb light within a wavelength range of 400 to 500 nm. The second light-absorbing layer 116b may absorb light within a wavelength range of 500 to 600 nm. As another example, the first light-absorbing layer 116a may absorb light within a wavelength range of 434 to 461 nm, and the second light-absorbing layer 116b may absorb light within a wavelength range of 524 to 557 nm.

The first light-absorbing layer 116a may be adhered to the second light-absorbing layer 116b. For example, an adhesive may be applied to the first light-absorbing layer 116a, and the first light-absorbing layer 116a may be laminated on and adhered to the second light-absorbing layer 116b using the adhesive.

The first light-absorbing layer 116a may be located between the display panel 110 and the optical assembly 124, and the second light-absorbing layer 116b may be located between the display panel 110 and the first light-absorbing layer 116a. Alternatively, the first light-absorbing layer 116a may be located between the display panel 110 and the optical assembly 124, and the second light-absorbing layer 116b may be located between the first light-absorbing layer 116a and the optical assembly 124.

For example, the green phosphor GP may be a particle (SrGa2S4:Eu) having a size of 3 to 7 micrometers, and the red phosphor RP may be a particle ((Sr,Ca)AlSiN3:Eu) having a size of 1 micrometer or less.

The light L1 provided from the optical assembly 124, for example, blue-based light (refer to FIG. 7), may excite the green phosphor GP. The light L0 excited in and emitted from the green phosphor GP may excite the red phosphor RP. At this time, the light L1 (refer to FIG. 7) provided from the optical assembly 124 may have optical characteristics L1 such that blue-based light has high intensity. However, while passing through the light-absorbing layer 116, the light L1 may be converted into light L3 in which green (G)-based light and red (R)-based light have increased or enhanced intensity.

Figure 12:
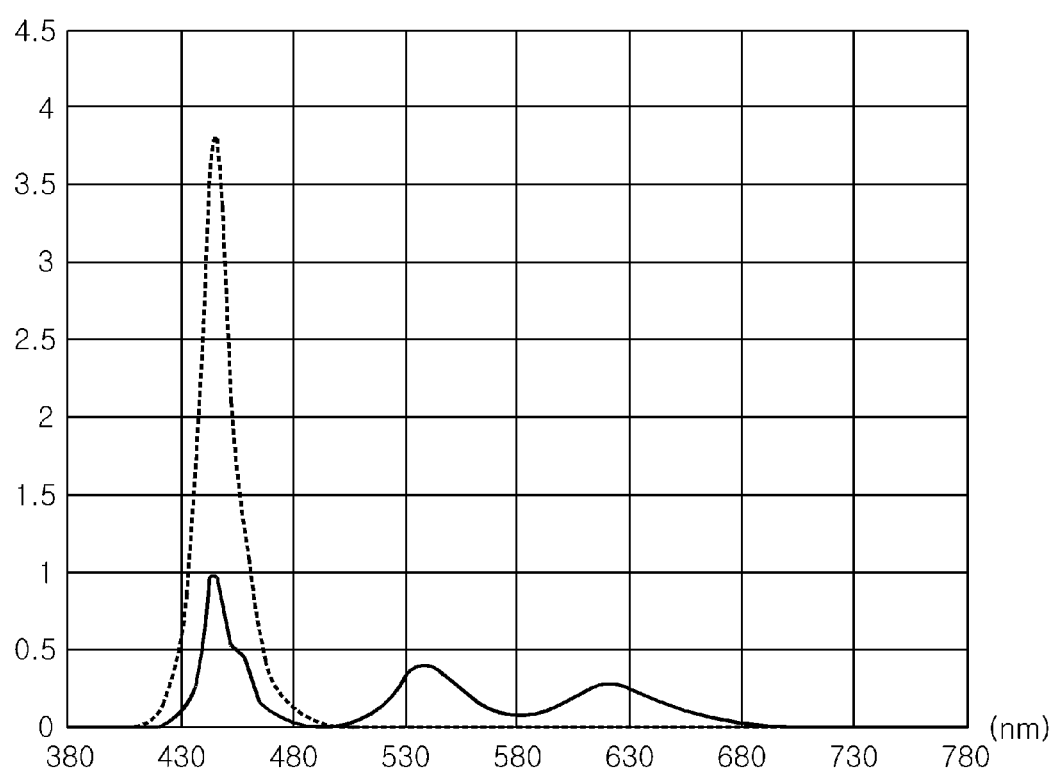
FIGS. 12 and 13 are views showing examples of a spectrum of light provided to the display panel according to embodiments of the present disclosure.

FIG. 12 shows an example of the spectrum (solid line) of the light L3 described above with reference to FIG. 11. Referring to FIG. 12, the light L3 that has passed through the light-absorbing layer 116 and the display panel 110 has optical characteristics such that blue (B)-based light, green (G)-based light, and red (R)-based light are evenly distributed. That is, it can be seen that color reproduction is improved.

The wavelength of the peak (center) region of the blue (B)-based light may be, for example, 443 to 450 nm. The wavelength of the peak (center) region of the green (G)-based light may be, for example, 530 to 550 nm. The wavelength of the peak (center) region of the red (R)-based light may be, for example, 610 to 630 nm.

Here, it may be possible to further improve color reproduction by changing the full width at half maximum of the light L3. The light-absorbing layer 116 described above with reference to FIG. 10 may be limited with regard to ability to control light to change the full width at half maximum of the light L2.

Figure 13:
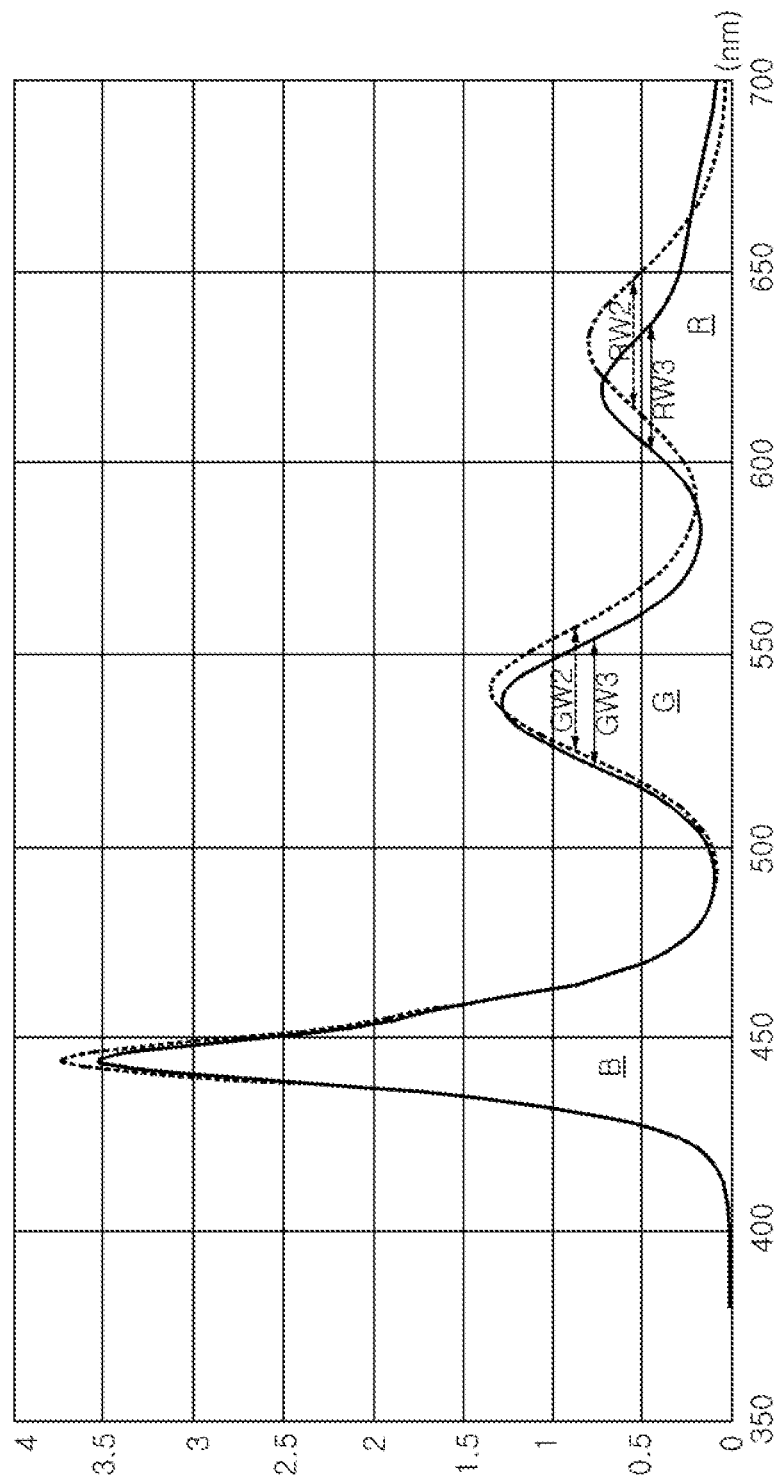

FIG. 13 shows an example of the spectrum (dotted line) of the light L2 provided to the display panel 110 when the light-absorbing layer 116 includes both a green phosphor GP and a red phosphor RP (refer to FIG. 10). In addition, FIG. 13 shows an example of the spectrum (solid line) of the light L3 provided to the display panel 110 when the light-absorbing layer 116 includes the first light-absorbing layer 116a and the second light-absorbing layer 116b, the first light-absorbing layer 116a includes a green phosphor GP, and the second light-absorbing layer 116b includes a red phosphor RP.

Referring to FIGS. 11, 12 and 13, the light L1 provided from the optical assembly 124 may excite the green phosphor GP while passing through the first light-absorbing layer 116a. For example, the blue (B)-based light provided from the optical assembly 124 may excite the green phosphor GP while being absorbed in or reflected from the green phosphor GP, and the green phosphor GP may emit green (G)-based light L0.

The light L0 that has passed through the first light-absorbing layer 116a may excite the red phosphor RP while passing through the second light-absorbing layer 116b. For example, the green (G)-based light L0 emitted from the green phosphor GP in the first light-absorbing layer 116a may excite the red phosphor RP while being absorbed in or reflected from the red phosphor RP included in the second light-absorbing layer 116b, and the red phosphor RP may emit red (R)-based light.

This light conversion may be repeated while recycling light.

Accordingly, the full width at half maximum GW3 of the green (G)-based light of the light L3 provided to the display panel 110 may decrease below the full width at half maximum GW2 of the green (G)-based light of the light L2 provided to the display panel 110. When the full width at half maximum GW3 of the green (G)-based light decreases, the purity of the green (G) color may be improved, and color reproduction may be further improved. The wavelength of the peak (center) region of the green (G)-based light may be 535 to 545 nm, and the full width at half maximum GW3 thereof may be 35 to 45 nm.

In addition, the full width at half maximum RW3 of the red (R)-based light of the light L3 provided to the display panel 110 may decrease below the full width at half maximum RW2 of the red (R)-based light of the light L2 provided to the display panel 110. When the full width at half maximum RW3 of the red (R)-based light decreases, the purity of the red (R) color may be improved, and color reproduction may be further improved.

Figure 14:
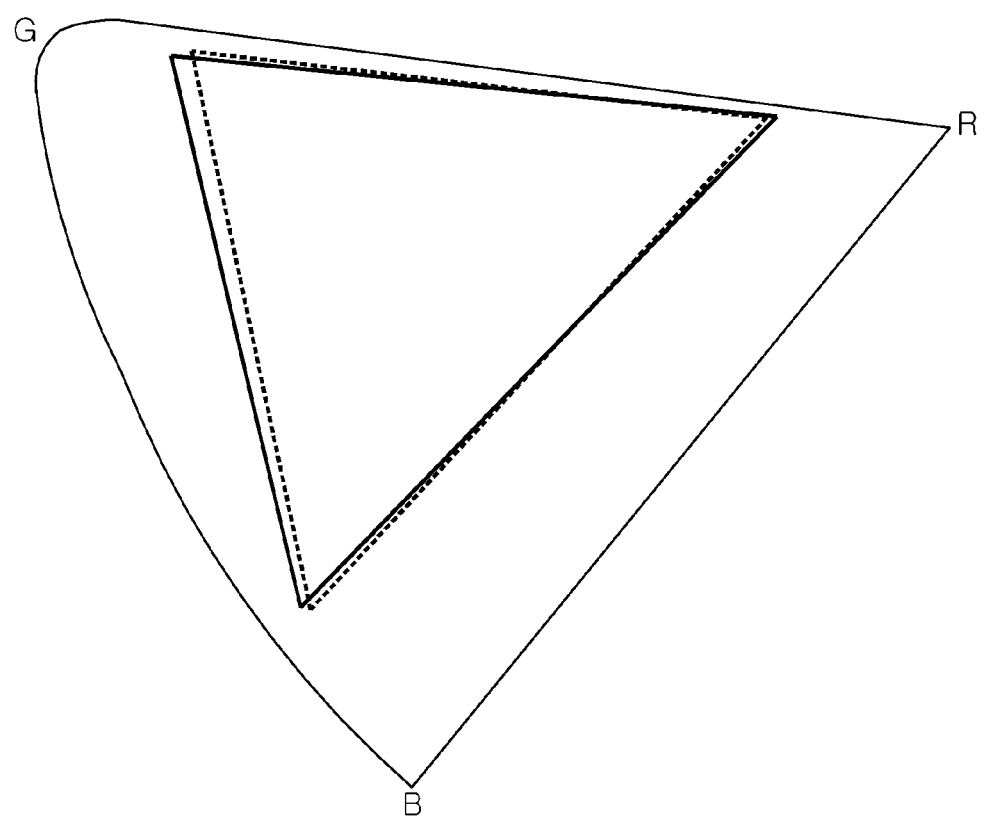
FIG. 14 is a view showing an example of color coordinates of light provided to the display panel according to embodiments of the present disclosure.

FIG. 14 shows RGB color coordinates in the configurations shown in FIGS. 10 and 11. Here, the light L2 provided to the display panel 110 is indicated by a dotted line, and the light L3 provided to the display panel 110 is indicated by a solid line.

It can be seen that the green color coordinates of the light L3 provided to the display panel 110 move closer to the boundary G than the green color coordinates of the light L2 provided to the display panel 110. This means that the purity of the green color of the light L3 provided to the display panel 110 is higher and that the color reproduction of the light L3 provided to the display panel 110 is further improved.

Figure 15:
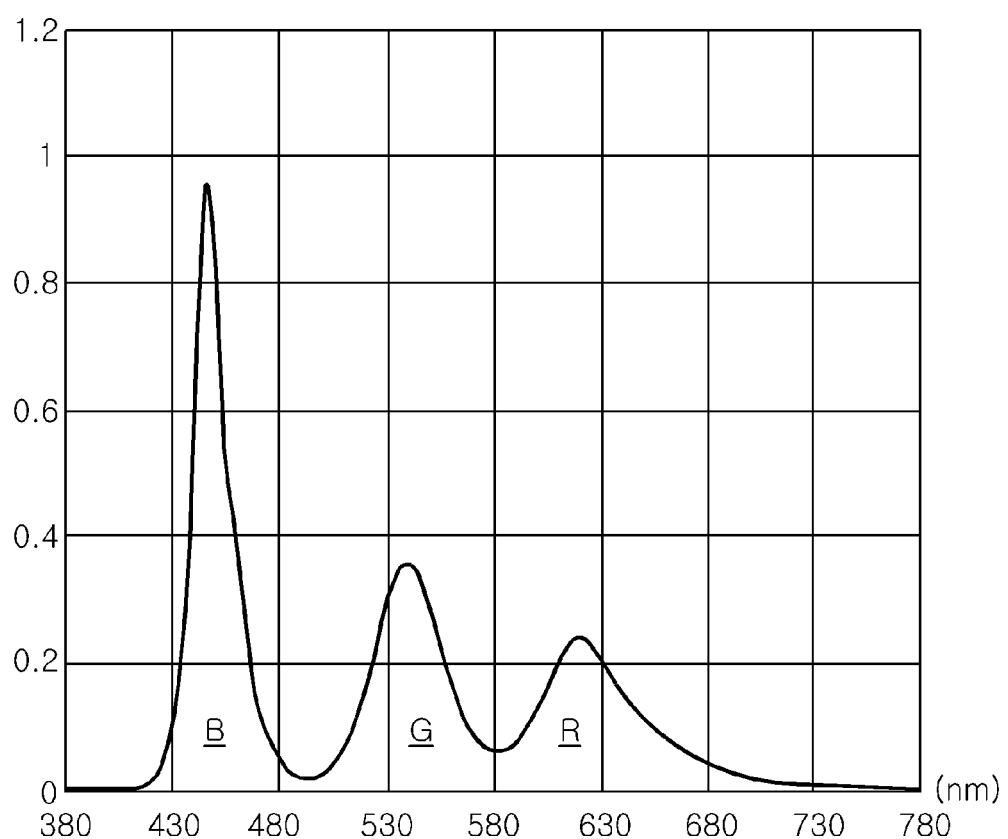
FIG. 15 is a view showing an example of an intensity ratio of light provided to the display panel according to embodiments of the present disclosure.

Referring to FIG. 15, the intensity of the green (G)-based light may be 20 to 70% of the intensity of the blue (B)-based light provided to the display panel 110 (refer to FIGS. 10 and 11). The intensity of the red (R)-based light may be 20 to 70% of the intensity of the blue (B)-based light provided to the display panel 110.

For example, the intensity of the green (G)-based light may be 35 to 40% of the intensity of the blue (B)-based light provided to the display panel 110. The intensity of the red (R)-based light may be 21 to 28% of the intensity of the blue (B)-based light provided to the display panel 110.

As another example, the intensity of the green (G)-based light may be 37% of the intensity of the blue (B)-based light provided to the display panel 110. The intensity of the red (R)-based light may be 25% of the intensity of the blue (B)-based light provided to the display panel 110.

Referring to FIGS. 1 to 15, a display device according to one aspect of the present disclosure may include a display panel, an optical assembly configured to provide blue-based light to the display panel, and a light-absorbing layer located in the path of light provided from the optical assembly to the display panel, the light-absorbing layer being configured to absorb light in a predetermined wavelength range. The light provided to the display panel through the light-absorbing layer may have optical characteristics such that the intensity of green-based light is 20 to 70% of the intensity (100%) of the blue-based light and the intensity of red-based light is 20 to 70% of the intensity of the blue-based light.

According to another aspect of the present disclosure, the light provided to the display panel through the light-absorbing layer may have optical characteristics such that the intensity of the green-based light is 35 to 40% of the intensity of the blue-based light and the intensity of the red-based light is 21 to 28% of the intensity of the blue-based light.

According to another aspect of the present disclosure, the light-absorbing layer may include a green phosphor and a red phosphor.

According to another aspect of the present disclosure, the green phosphor may include a particle having a size of 3 to 7 micrometers, and the red phosphor may include a particle having a size of 1 micrometer or less.

According to another aspect of the present disclosure, the light-absorbing layer may include a first light-absorbing layer, located between the optical assembly and the display panel, and a second light-absorbing layer, located between the first light-absorbing layer and the display panel.

According to another aspect of the present disclosure, the first light-absorbing layer may include a green phosphor having a size of 3 to 7 micrometers, and the second light-absorbing layer may include a red phosphor having a size of 1 micrometer or less.

According to another aspect of the present disclosure, the first light-absorbing layer may be a film having a thickness of about 90 micrometers, the second light-absorbing layer may be a film having a thickness of about 3 micrometers, and the first light-absorbing layer may be adhered to the second light-absorbing layer.

According to another aspect of the present disclosure, the wavelength of the peak (center) region of the blue-based light may be 443 to 450 nm, the wavelength of the peak (center) region of the green-based light may be 530 to 550 nm, and the wavelength of the peak (center) region of the red-based light may be 610 to 630 nm.

According to another aspect of the present disclosure, the wavelength of the peak (center) region of the green-based light may be 535 to 545 nm, and the full width at half maximum of the green-based light may be 35 to 45 nm.

According to another aspect of the present disclosure, the color temperature of an image provided from the front surface of the display panel may be 10,000 to 12,000 K.

As is apparent from the above description, the display device according the present disclosure has the following effects.

According to at least one of embodiments of the present disclosure, the image quality of the display device may be improved.

According to at least one of embodiments of the present disclosure, color reproduction may be improved.

According to at least one of embodiments of the present disclosure, the wavelength of light provided from a backlight unit may be effectively controlled.

The additional scope of applicability of the present disclosure will be apparent from the above detailed description. However, those skilled in the art will appreciate that various modifications and alterations are possible, without departing from the idea and scope of the present disclosure, and therefore it should be understood that the detailed description and specific embodiments, such as the preferred embodiments of the present disclosure, are provided only for illustration.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
   a display panel;
   an optical assembly providing blue-based light to the display panel; and
   a light-absorbing layer located in a path of light provided from the optical assembly to the display panel, the light-absorbing layer absorbing light in a predetermined wavelength range, and the light-absorbing layer includes a first light-absorbing layer located between the optical assembly and the display panel and a second light-absorbing layer located between the first light-absorbing layer and the display panel,
   wherein the first light-absorbing layer includes a green phosphor and the second light-absorbing layer includes a red phosphor,
   wherein a thickness of the first light-absorbing layer is at least 10 times thicker than a thickness of the second light-absorbing layer, and the first light-absorbing layer is adhered to the second light-absorbing layer, and
   wherein light provided to the display panel through the light-absorbing layer has optical characteristics such that an intensity of green-based light is 20 to 70% of an intensity (100%) of the blue-based light and an intensity of red-based light is 20 to 70% of the intensity of the blue-based light.

2. The display device according to claim 1, wherein the light provided to the display panel through the light-absorbing layer has optical characteristics such that the intensity of the green-based light is 35 to 40% of the intensity of the blue-based light and the intensity of the red-based light is 21 to 28% of the intensity of the blue-based light.

3. The display device according to claim 1, wherein the first light-absorbing layer comprises the green phosphor having a size of 3 to 7 micrometers, and wherein the second light-absorbing layer comprises the red phosphor having a size of 1 micrometer or less.

4. The display device according to claim 1, wherein the first light-absorbing layer is a film having a thickness of about 90 micrometers, and wherein the second light-absorbing layer is a film having a thickness of about 3 micrometers.

5. The display device according to claim 4, wherein a peak of a wavelength of the blue-based light is 443 to 450 nm, wherein a peak of a wavelength of the green-based light is 530 to 550 nm, and wherein a peak of a wavelength of the red-based light is 610 to 630 nm.

6. The display device according to claim 1, wherein a peak of a wavelength of the green-based light is 535 to 545 nm, and a full width at half maximum of the green-based light is 35 to 45 nm.

7. The display device according to claim 1, wherein a color temperature of an image provided from a front surface of the display panel is 10,000 to 12,000 K.

\* \* \* \* \*